INVENTOR
FRANCIS L. EBEL
BY Watson, Cole, Grindle &
Watson
ATTORNEYS

Jan. 24, 1961   F. L. EBEL   2,969,532
MULTIPLE INDICATORS

Filed Jan. 8, 1957   3 Sheets-Sheet 2

INVENTOR
FRANCIS L. EBEL

BY Watson, Cole, Grindle &
Watson
ATTORNEYS

Jan. 24, 1961  F. L. EBEL  2,969,532
MULTIPLE INDICATORS
Filed Jan. 8, 1957  3 Sheets-Sheet 3

INVENTOR
FRANCIS L. EBEL

BY Watson, Cole, Grindle & Watson
ATTORNEYS

United States Patent Office 2,969,532
Patented Jan. 24, 1961

2,969,532

MULTIPLE INDICATORS

Francis Leonard Ebel, Hayes, England, assignor, by mesne assignments, to Fairey Aviation Limited, Hayes, England, a company of Great Britain Filed Jan. 8, 1957, Ser. No. 633,056

Claims priority, application Great Britain Jan. 9, 1956

10 Claims. (Cl. 340—327)

This invention relates to multiple visual indicators, that is to say instruments capable of giving several alternative indicating signals to indicate any one of a number of different occurrences. The invention is particularly although not exclusively suitable for use in aircraft.

In an aircraft with a number of services, such as fuel supply, electric power supply, and a hydraulic system for operating servo motors, it is important that the pilot should know if a failure of any one of them occurs, while it is equally important that certain other occurrences, for example the outbreak of fire, should also be notified immediately to the pilot. It is known to provide electrical and other means for indicating a single one of these occurrences but a different indicator for each occurrence would unnecessarily overcrowd the instrument panel and accordingly a multiple visual indicator may be arranged to indicate any one of the occurrences. This however is only one of the applications of the invention.

According to one aspect of the present invention a multiple visual indicator includes at least two individual indicators each arranged to indicate a different occurrence, a common indicator arranged to indicate any one of the different occurrences, and means operative only after one of the occurrences for rendering the common indicator incapable of further indicating that occurrence leaving the common indicator and the remaining individual indicators ready to indicate the other occurrences.

Each individual indicator may comprise an electric lamp while the common indicator comprises an electric lamp distinct from the other lamps, for example it may comprise a lamp which flashes on and off continually when energised while the other lamps give steady lights. The flashing light will draw the pilot's attention to the fact that there has been an occurrence and he can then examine the individual indicators to see which it is, and this enables the individual indicators to be fairly small since they are not required to attract the attention of the pilot in the first place.

In one form of the invention the lamps are mounted on an indicating panel with the common indicator lamp surrounded by the others.

Each ocurrence may effect the energisation of the appropriate one of a number of different electric circuits each containing one of the individual indicators, to energise the respective individual indicator, and may also effect the energisation of one of a number of different electric circuits each connected to the common indicator to energise the latter. In a simple arrangement one of the occurrences effects the closing of a relay which connects an electric supply to the common indicator and to the corresponding individual indicator.

The means for rendering the common indicator incapable may include a number of holding switches each associated with one of the individual indicators and controlling one of the circuits containing the common indicator and being arranged to be held open as long as the associated individual indicator remains energised; thus a member may be arranged to open all the holding switches manually while a number of electromagnetic relays are provided each excited by the energisation of one of the individual circuits and each strong enough to hold the corresponding holding switch open but not strong enough to open it. An incidental advantage is that the electromagnetic relays may be smaller than they would need to be if they had to be strong enough to open the switches, whereby economy of space can be achieved. The manual member may comprise a central knob or handle containing the light constituting the common indicator, and it may also be arranged to energise all the individual indicators temporarily so that it can act as a test push to see if all the individual indicators are operating correctly.

The brightness of the steady lights may be variable so that the pilot can have a brighter light by day than by night, for example a relay may be coupled to a manual switch to connect a resistor in series with the current path of the individual lamps when the switch is in a dim position and to disconnect or short-circuit the resistor when the switch is in a bright position. This resistor may be current-responsive so that the voltage drop remains substantially constant irrespective of how many individual indicators are illuminated simultaneously.

According to another aspect of the invention a multiple electric visual indicator includes a number of individual electric indicators each associated with a separate indicator switch arranged to connect it to an electric power supply to energise it, and a common electric indicator connected directly to all the individual indicators so as to be energised when any one of the indicators is energised, the connection between each individual indicator and the common indicator including a separate rectifier arranged to prevent the energisation of that individual indicator by current flowing as a result of the closing of the indicator switch associated with another of the individual indicators.

The rectifiers enable current to flow from one of the indicator switches to the common indicator without flowing also to any of the individual indicators except that associated with the particular indicator switch.

The arrangement may include switch means operative only after the indicator switch associated with any one of the individual indicators has been closed for rendering the common indicator incapable of being further energised by current flowing as a result of the closing of that indicator switch, the said switch means leaving the common indicator and the remaining individual indicators ready to be energised by the closing of any of the remaining indicator switches.

The invention may be carried into practice in various ways but one specific embodiment will now be described by way of example with reference to the accompanying drawings, in which.

Figure 1:
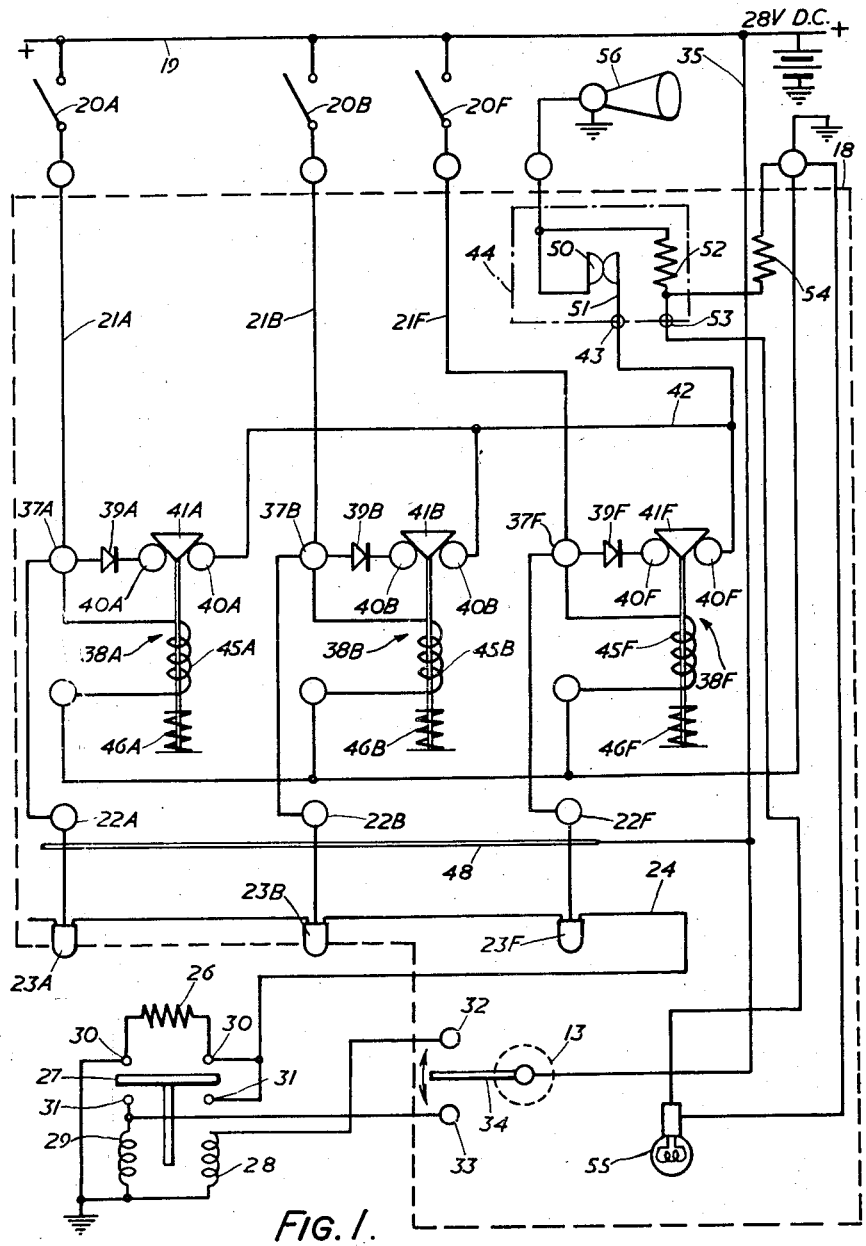
Figure 1 is a circuit diagram of a multiple indicator layout for an aircraft.

The embodiment illustrated in the drawings comprises a multiple visual indicator system for an aircraft, for giving warning if certain services of the aircraft fail. The indicator is intended to give a visual and possibly also an audible warning if a service, for example the fuel supply, should fail or if for example a fire should occur, each such occurrence being arranged in known manner to close a fault relay and there being one fault relay for each occurrence to be indicated.

Figure 2:
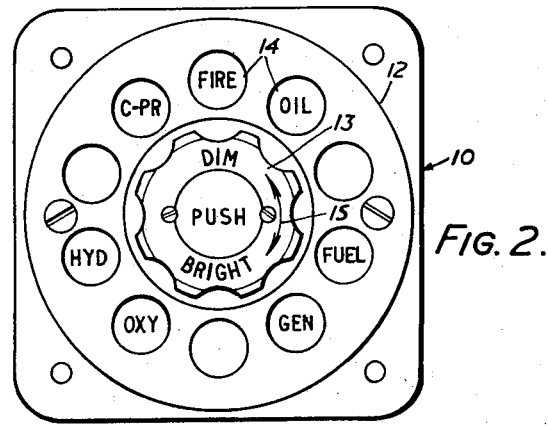
Figure 2 is a view of the front panel of the multiple indicator unit.
Figure 3:
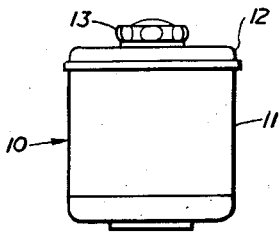
Figure 3 is a diagrammatic view showing the multiple indicator unit in side view with an associated circuit diagram indicating the connections which are to be made to its terminals.
Figure 3:
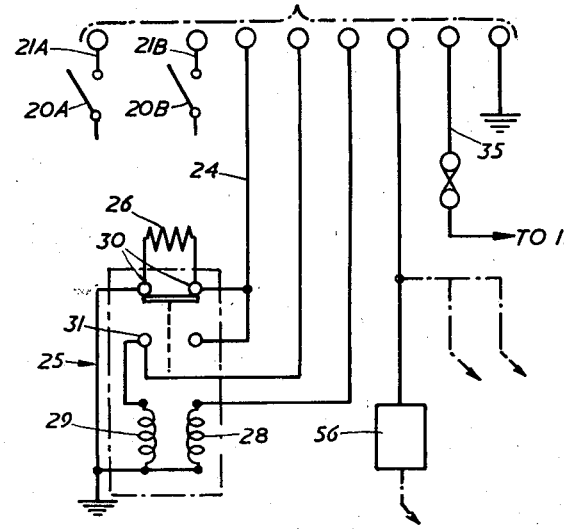
Figure 4:
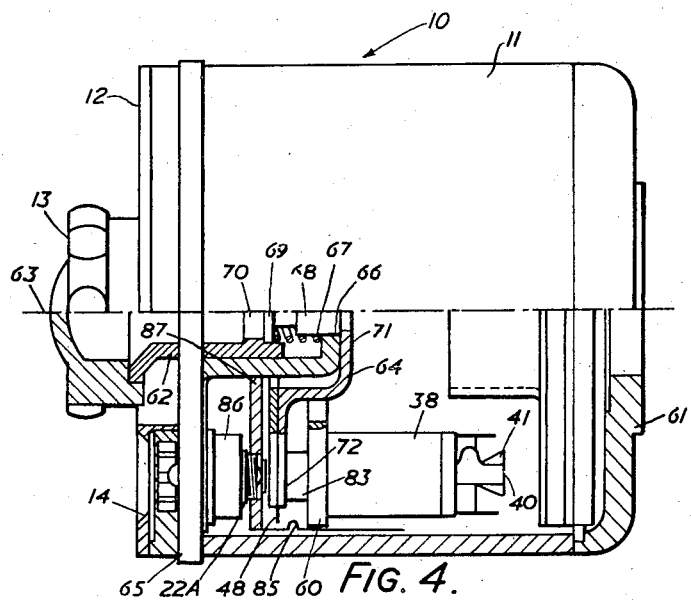
Figure 4 is a sectional view of the multiple indicator unit.
Figure 5:
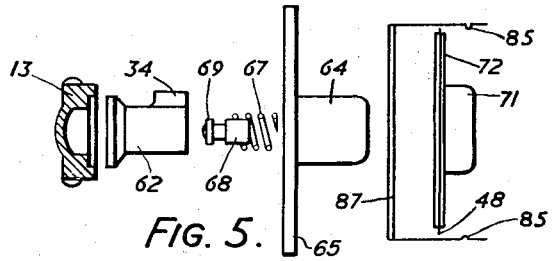
Figure 5 is an exploded view of the main movable assembly of the indicator unit.

The indicator unit itself is illustrated at 10 in Figures 2, 3 and 4, and comprises a casing 11 having a front panel 12 with a central control knob 13 containing an electric lamp bulb, and a number of circular windows 14 arranged circumferentially around the knob 13 and each arranged to be illuminated by a warning lamp behind it. Written across the front of each window is a brief description of the nature of the fault which it is to indicate, e.g. "Fire," "Oil," "Fuel," etc., as shown in Figure 2. Certain unlabelled spare windows 14 are provided for use in case additional indications are required to be subsequently included.

When a fault occurs and a fault relay closes, the corresponding warning lamp bulb is connected to a source of supply to illuminate the appropriately labelled window 14, whilst the central lamp in the knob 13 starts to flash on and off continuously to draw the attention of the pilot to the indicator unit 10. If the fault can be cleared, the warning light in the labelled window 14 and also the flashing light in the knob 13 are extinguished, whilst if the fault cannot be cleared the pilot can turn off the flashing light in the knob 13 without however turning off the warning light in the labelled window 14, by pushing the knob 13 in towards the face of the instrument and then releasing it.

A bright/dim switch is incorporated in the central knob 13 as indicated by the arrow 15 and the associated wording, so that by turning the knob clockwise or anti-clockwise the switch can be made bright or dim according to whether it is to be used by day or by night.

The general circuit arrangement is indicated in Figure 1, the broken line 18 indicating diagrammatically the limits of the casing 11 of the indicator unit 10 so as to show which components are within and which are outside the unit 10.

A busbar 19 connected to a source of direct current at 28 volts positive to earth, is connected to the various fault relays indicated at 20A, 20B and 20F, only three of the fault relays being illustrated in Figure 1 although in practice more than three would normally be provided. A conductor 21A connects the other terminal of the fault relay 20A to one terminal 22A of the corresponding warning lamp 23A in the appropriately labelled window 14 of the unit 10, the other or negative terminal of the lamp 23A being connected in common with those of the other warning lamps 23B, 23F etc., by a conductor 24 through a brightness control unit outside the casing of the unit 10 to earth.

The brightness control unit is indicated generally at 25 and comprises a thermally-responsive resistor 26, that is a resistor whose resistance varies in accordance with the current passing through it so that it tends to maintain a constant voltage. This thermal resistor 26 is normally short-circuited by the moving contact 27 of a relay having two operating coils 28 and 29. The moving relay contact 27 normally bridges the two fixed contacts 30 across which the thermal resistor 26 is connected so as to short-circuit the latter, but can be moved into an alternative position in which it no longer bridges the contacts 30 but bridges a second pair of fixed contacts 31. The relay coil 28 is the "bright" coil which when excited moves the moving contact 27 into its position in which it short-circuits the thermal resistor 26, whilst the other relay coil 29 is the "dim" coil which when excited holds the moving contact 27 in the other position bridging the fixed contacts 31. The two coils 28 and 29 are respectively connected to the bright contact 32 and the dim contact 33 of a two-way switch, the arm 34 of which is connected to the 28 volt supply busbar by a conductor 35 and is mounted on the shaft of the control knob 13 for rotation therewith. The common ends of the two coils 28 and 29 are connected, in common with one of the contacts 30, to earth whilst the other contact 30 and one of the contacts 31 are both connected to the common lead 24 from the negative terminals of the warning lamps 23A, 23B and 23F etc. The remaining fixed contact 31 is connected to the "dim" relay coil 29.

Thus if the two-way switch on the control knob 13 is moved to the "Bright" position in which its arm 34 engages the "bright" contact 32, the "bright" relay coil 28 is energised causing the moving contact 27 to short-circuit the thermal resistor 26 so that the lamp illuminating current from the conductor 24 passes directly to earth; if the two-way switch is turned to the "Dim" position in which its arm 34 engages the "dim" contact 33 the warning lamp current in the conductor 24 flows to earth through parallel resistive paths, one containing the thermal resistor 26 and the other containing the "dim" coil 29 of the relay, so that the current will be reduced and the lamps will be dimmed. If it should happen that more than one fault has occurred, so that more than one of the fault relays 20A, 20B, 20F etc. is closed, fault currents will flow through more than one warning lamp, and these combined fault currents in the conductor 24 will cause the thermal resistor 26 to be heated to a higher temperature so that its resistance will decrease correspondingly and the current flowing through it will increase, whereby the illumination level of each warning lamp remains substantially constant. The resistance of the thermal resistor 26 is small in comparison with that of the "dim" coil 29 of the relay.

The conductor 21A leading from the fault relay 20A is also connected to the input terminal 37A of an individual indicator relay indicated at 38A in Figure 1, within the casing of the unit 10. The input terminal 37A is connected through a rectifier 39A included in the relay assembly to one of a pair of contacts 40A which are normally bridged by the moving relay contact 41A. The other contact 40A is connected to a common conductor 42 leading to one terminal 43 of a flasher unit 44. The input terminal 37A of the relay 38A is also connected to earth through a holding coil 45A which when energised is strong enough to hold the moving relay contact 41A out once it is mechanically pushed out, but is not strong enough to pull it out against the action of the relay spring 46A tending to close the relay contacts.

Each of the other fault relays 20B, 20F etc. is similarly connected to its associated warning lamp 23B, 23F etc. through a conductor 21B, 21F etc., and to its associated indicator relay 38B, 38F etc., corresponding parts in each case being indicated by the same reference numbers bearing the suffixes B, F, etc.

A contact ring indicated at 48 and associated with the control knob 13 of the indicator unit is connected to the 28 volt busbar 19 via the conductor 35 and can be moved into connection with the positive terminals 22A, 22B, 22F etc., of all the warning lamps 23A, 23B, 23F etc. when the control knob 13 is pushed in, so that the contact ring 48 will then connect the 28 volt supply across all the warning lamps thus simulating the closing of all the fault relays for test purposes.

The flasher unit 44 is of the kind having a pair of make-and-break contacts 50 one of which is carried on a bimetal member 51 in series with a heating element 52 which is arranged to heat the bimetal member 51 to cause it to move so as to separate the contacts 50. Once the contacts 50 have been separated the heating element 52 ceases to pass current and the bimetal 51 starts to cool, so that the contacts 50 close again, after which the heating and contact-breaking cycle is repeated. The other terminal 53 of the flasher unit 44 is connected to earth through a resistor 54 in parallel with the filament of a flasher bulb 55 mounted in a bulb holder in the control knob 13 of the indicator unit. If an audible warning is also required, a horn 56 may also be connected between the flasher unit 44 and earth for example as indicated in Figure 1.

It will thus be seen that if any one of the fault relays 20A, 20B, 20F etc., becomes closed on the occurrence of a fault, the 28 volt supply busbar 19 will be connected to the flasher unit 44 to cause a flashing signal at the bulb 55, as well as causing a warning signal from the warning lamp 23A, 23B or 23F associated with the fault relay in question. The rectifiers 39A etc. prevent current from the common line 42 flowing in reverse to any of the relays 38A etc. which are unexcited.

The general construction of the indicator unit 10 is illustrated in Figures 2, 3, 4 and 5. The indicator relays 38A etc. are all arranged circumferentially in the unit 10 around the axis of the central control knob 13, one relay being indicated at 38 in Figure 4, and are supported by an annular plate 60 secured to the indicator casing 11. The flasher unit 44 is mounted on the base 61 of the casing centrally of the relays 38 and is not visible in Figure 4.

The control knob 13 is mounted on the end of a central hollow metal sleeve 62 which is constructed to form a lamp-holder for the flashing lamp 55, the control knob 13 being formed with a translucent window 63 through which the flashing lamp signals are visible. The lamp-holder sleeve 62 can slide axially in a fixed sleeve 64 secured to the main front plate 65 of the casing 11, the sleeve 64 having at its inner end an inwardly directed flange 66 against which presses one end of a compression spring 67 tending to push the knob 13 outwardly away from the front panel 12 of the casing 11. The spring 67 surrounds an operating stud 68 having a flange 69 at its outer end against which the other end of the spring 67 engaged to press the flange 69 against a co-operating internal shoulder 70 formed in the bore of the lamp-holder sleeve 62. The body of the stud 68 extends through the open end of the fixed sleeve 64 to engage the central portion of a dished insulating plate 71 provided with an external annular flange 72 which cooperates with the indicator relays 38.

Figure 6:
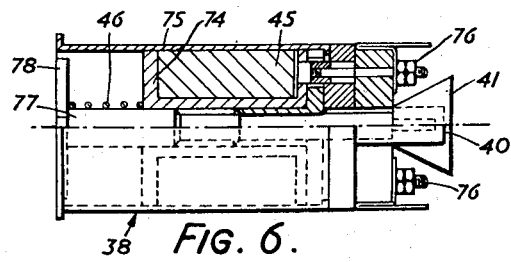
Figure 6 is a sectional view of one of the several indicator relays incorporated in the indicator unit.
Figure 7:
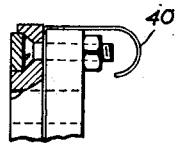
Figure 7 is a fragmentary diagram showing the construction of one of the relay contacts of the relay of Figure 6.

The construction of one of the relays 38 is indicated in Figures 6 and 7. Thus the relay 38 comprises a solenoid 45 wound on a bobbin 74 mounted in a surrounding sleeve 75 and provided with terminals 76 to which the ends of the associated conductors are secured. The relay is also provided with a central bore which receives an armature in the form of a soft iron plunger 77 formed at one end with a head 78 for co-operation with the annular flange 72 of the dished plate 71, and at the other end carrying the tapered bridging contact 41 which constitutes the moving contact of the relay and which co-operates with the two fixed contacts 40 which as shown in Figure 7 comprise strips of springy metal whose outer ends are curved over inwardly to semi-circular form for engagement by the tapered moving contact 41. The relay spring 46 acts between the head 78 of the plunger and the end of the bobbin 74 and tends to urge the plunger towards the front panel 12 of the unit 10 so as to keep the moving relay contact 41 in its closed position bridging the fixed contacts 40. The relay solenoid 45 when energised by the closing of the associated fault switch on the occurrence of a fault is not strong enough to pull out the relay plunger 77 unaided against the force of the spring 46 to open the relay contacts, but the energised solenoid 45 exerts a sufficient electromagnetic force on the plunger 77 when the latter has been pushed out mechanically to hold the relay contacts open against the closing force of the spring 46.

Thus when the control knob 13 is pushed in, the dished plate 71 also moves inwardly so that its annular flange 72, acting through shock absorbing distance pieces 83, pushes all the relay plungers 77 to the right as seen in Figures 4 and 6 so as to open the normally closed contacts of all the relays 38. When the control knob 13 is released, the spring 67 pushes it out to its former position and the relay springs 46 of all the relays 38 which are not excited push back the associated relay plungers 77 to close the contacts of the unexcited relays, the plungers pushing the plate 71 back against the end of the fixed sleeve 64 as they move. However if one of the relays 38 is already energised as a result of the closing of its associated fault switch, its solenoid 45 will hold its plunger 77 in the open position to keep the relay contacts open.

Thus if any one of the fault relays 20A etc. is closed, the contacts of the indicator relay 38 associated with that fault relay will remain open so that when the control knob 13 returns to its normal position, the flasher lamp 55 in the knob 13 goes out and only the warning lamp 23A etc. associated with the fault remains illuminated.

The annular flange 72 on the dished plate 71 also carries a circumferential metal fin constituting the contact ring 48 which is connected to the 28 volt supply through the conductor 35 (Figure 1). When the plate 72 is pushed in by means of the control knob 13 the contact ring 48 makes contact with individual contacts 85 mounted in the side of the indicator casing 11 and each connected to the positive terminal 22A etc. of one of the warning lights 23A etc., so that all the warning lights 23A etc. are lighted so long as the knob 13 remains pushed in to cause the contact ring 48 to come into contact with all of the fixed contacts 85. The warning lights 23A etc., are mounted in lamp holders 86 carried by the front plate 65 of the indicator unit and arranged so that the warning lamps 23A etc. come into register with the circumferentially arranged circular windows 14 in the front panel 12.

The control knob 13 also carries the arm 34 of the bright/dim switch in the form of a radial contact 34 on the side of the lamp holder sleeve 62 to which the knob 13 is secured. The radial contact arm 34 can be put into contact with either of the bright and dim contacts 32 and 33 (Figure 1), which are mounted on a fixed contact plate 87 within the unit but are not visible in Figure 4. Thus the rotation of the control knob 13 in either direction operates the bright/dim switch to connect the 28 volt supply to the respective coil 28 or 29 in the bright/dim relay so that one or other of these coils will be energised in accordance with the setting of the switch and the pilot can have a bright light for use during the day or a dim light for use at night.

The operation of the apparatus is as follows. Before take-off the pilot tests to see whether the indicator system is working properly by pushing the control knob 13 in, to cause the contact ring 48 to connect the 28-volt supply across all the warning lamps 23A etc. If one of the warning lamps does not light up the pilot can have the fault in the indicator corrected before take-off.

In flight, so long as no fault occurs the indicator will give no indication, but if for example fire breaks out and the fire fault relay 20F closes, the 28-volt supply will be connected through the input terminal 37F of the relay 38F through the rectifier 39F and the closed contacts 40F, 41F of the relay to the flasher unit 44, and will thus cause the flasher lamp 55 in the control knob 13 to light up intermittently and give a flashing signal. The horn 56 will also sound if connected. At the same time the associated warning lamp 23F will light up behind the window labelled "Fire." The flashing of the lamp 55 in the central knob 13 will draw the pilot's attention to the occurrence of a fault, and the illumination of the window labelled "Fire" will indicate the nature of the fault so that the pilot may then be able to take steps to correct the fault, for example by turning on the fire extinguishers. If the fault is cleared the fault relay 20F will re-open and both the flashing light 55 and the warning lamp 23F will be extinguished. If however the pilot is unable to clear the fault he can turn off the flashing light to prevent its distracting his attention (whilst leaving the warning light 23 illuminated) by pushing the control knob 13 in to open the contacts of all the relays 38A etc. At the moment when the knob 13 is pressed in all the warning lamps 23A etc. will light up. When the control knob 13 is released, however, the contacts of only that relay 38F which is connected through its fault relay 20F to the supply will remain open and all the other relays 38 will close once more. However since the contacts of the relay 38F remain open the flasher unit 44 will be disconnected from the supply and the flashing lamp 55 will no longer be illuminated. Once again all the warning lamps 23A etc., except the one 23F indicating the fault, will also be extinguished.

What I claim as my invention and desire to secure by Letters Patent is:

1. A multiple electric visual indicator which comprises a number of individual electric visual indicators, a corresponding number of individual electric circuits, each controlled by a separate indicator switch and each connecting one of the individual indicators in series with the associated indicator switch to a common source of direct current electric power, a common electric visual indicator electrically connected to all the indicator circuits by separate branch circuits, each including a separate rectifier, whereby on the closing of any one of the indicator switches, both the associated individual indicator and the common indicator are energized through the associated individual circuit, the rectifier being arranged to permit the energization of the individual indicator through its associated indicator switch when closed, but to prevent the energization of that individual indicator by current flowing as a result of the closing of another of the indicator switches, and which includes means for rendering the common indicator incapable of being further energized by current flowing as a result of the closing of any one of the indicator switches while leaving the common indicator and the remaining individual indicators in condition for subsequent energization by the closing of any of the remaining indicator switches.

2. An indicator as claimed in claim 1 in which the said means for rendering the common indicator incapable comprises normally closed electric relays biassed to their closed position and connected respectively in the branch circuits with their contacts in series with the respective rectifiers, and separate electromagnetic holding means respectively associated with each relay and each arranged to be energized from the associated individual circuit so long as the associated indicator switch is closed, each holding means when so energized being capable of holding the relay in its open position but incapable of opening the relay against its closing bias, and manually operable opening means common to all the relays for simultaneously opening them all and for subsequently allowing them all to close except such as are held open by the energization of their associated holding means.

3. An indicator as claimed in claim 1 in which each individual indicator comprises an electric lamp, the common indicator comprising an electric lamp distinct from the other lamps.

4. An indicator as claimed in claim 3 in which the common indicator is an electric lamp which flashes on and off continually when energised while the other lamps give steady lights when energised.

5. An indicator as claimed in claim 4 in which the lamps are all mounted on an indicating panel with the common indicator lamp surrounded by the others.

6. An indicator as claimed in claim 1 in which the manually operable opening means comprises a knob or handle containing an electric lamp.

7. An indicator as claimed in claim 6 in which the operation of the said member also temporarily energises all the individual indicators.

8. An indicator as claimed in claim 7 in which the individual indicators comprise electric lamps arranged when energized to shine continuously, and which includes means for varying the brightness of the individual indicators.

9. An indicator as claimed in claim 8 including a relay coupled to a switch to connect a resistor in series with the current path of the individual indicators when the switch is in a dim position and to disconnect or short-circuit the resistor when the switch is in a bright position.

10. An indicator as claimed in claim 9 including a current-responsive resistor common to the individual circuits and arranged to cause the brightness of the individual indicators to remain substantially constant irrespective of how many of the individual indicators are illuminated simultaneously.

References Cited in the file of this patent

UNITED STATES PATENTS

| | | |
|---|---|---|
| 2,262,650 | Reagan | Nov. 11, 1941 |
| 2,712,129 | Marmorstone | June 28, 1955 |
| 2,730,704 | Warren | Jan. 10, 1956 |
| 2,730,705 | Hallerberg | Jan. 10, 1956 |

FOREIGN PATENTS

| | | |
|---|---|---|
| 555,919 | Great Britain | Sept. 13, 1943 |